United States Patent
Ishida

(10) Patent No.: US 7,274,188 B2
(45) Date of Patent: Sep. 25, 2007

(54) PULSER RING MOUNTING STRUCTURE INCLUDING AN ANNULAR GROOVE FORMED ON A SIDE SURFACE OF A BRAKE DISK TO WHICH THE PULSER RING IS MOUNTED

(75) Inventor: Shinichiro Ishida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 50 days.

(21) Appl. No.: 11/226,302

(22) Filed: Sep. 15, 2005

(65) Prior Publication Data

US 2006/0066294 A1 Mar. 30, 2006

(30) Foreign Application Priority Data

Sep. 30, 2004 (JP) ............................. 2004-289235

(51) Int. Cl.
*G01F 3/44* (2006.01)
*G01B 7/30* (2006.01)
(52) U.S. Cl. ...................... 324/173; 324/174; 324/166; 324/207.25
(58) Field of Classification Search ........ 324/166–174, 324/207.12–207.25
See application file for complete search history.

(56) References Cited

U.S. PATENT DOCUMENTS 6,910,556 B1 * 6/2005 Baumgartner et al. ................... 188/218 XL

FOREIGN PATENT DOCUMENTS

JP 4-256860 A 9/1992

* cited by examiner

*Primary Examiner*—Jay M Patidar
(74) *Attorney, Agent, or Firm*—Birch, Stewart, Kolasch & Birch, LLP

(57) ABSTRACT

In a motorcycle, to prevent an increase in the diameter of a hub in association with the mounting of a pulser ring and for increasing the flexibility when arranging a wheel speed sensor. An annular groove is formed on a side surface of an annular rear brake disk in an annular shape. A stepped annular pulser ring is mounted to the side surface of the rear brake disk so that a pulser section is located in the groove. Thus, a space for accommodating the pulser ring on an inner periphery of the rear brake disk is eliminated. In addition, the size of a hub-engagement hole on the rear brake disk may be reduced. Since the pulser section of the pulser ring is located in the groove of the rear brake disk, it does not take much space in the direction of an axle.

20 Claims, 3 Drawing Sheets

PULSER RING MOUNTING STRUCTURE INCLUDING AN ANNULAR GROOVE FORMED ON A SIDE SURFACE OF A BRAKE DISK TO WHICH THE PULSER RING IS MOUNTED

CROSS-REFERENCE TO RELATED APPLICATIONS

The present application claims priority under 35 USC 119 to Japanese Patent Application No. 2004-289235 filed on Sep. 30, 2004 the entire contents of which are hereby incorporated by reference.

1. Field of the Invention

The present invention relates to a pulser ring mounting structure suitable to be applied specially to motorcycles having an ABS (Anti-Lock Brake System).

2. Description of Background Art

When a wheel speed sensor is mounted relative to a wheel (either a front wheel or a rear wheel) of a motorcycle, an annular pulser ring is disposed on an inner periphery of an annular brake disk and the brake disk and the pulser ring are fixed to a hub respectively with bolts. See, for example, JP-A-4-256860, paragraph [0008], FIG. 2 and FIG. 3.

However, in this structure, a space for accommodating the pulser ring on the inner periphery of the brake disk must be secured. Therefore, an engaging position with respect to the hub is inevitably moved radially outwardly. Consequently, there arises a problem such that the size of a hub-engagement hole on the brake disk increases and the diameter of the hub increases correspondingly.

SUMMARY AND OBJECTS OF THE INVENTION

It is an object of the present invention to provide a pulser ring mounting structure which can solve the above-described problem.

In an embodiment of the invention, an annular brake disk is mounted on a wheel and is provided together with an annular pulser ring formed with a pickup hole and a wheel speed sensor for detecting pulse signals using the pickup hole. A groove is formed on a side surface of the brake disk in an annular shape, and the pulser ring is mounted to the side surface of the brake disk with a pulser section positioned at the groove.

An embodiment of the present invention provides that the pulser ring is located between the brake disk and a final gear case.

An embodiment of the present invention provides that the pulser ring is provided with the wheel speed sensor inside a swing arm so as to be invisible.

According to the present invention, since the necessity to secure a space for accommodating the pulser ring on an inner periphery of the brake disk is eliminated, the size of a hub-engagement hole on the brake disk can be reduced. In addition, since the pulser ring is mounted to the brake disk, the size of a hub can be reduced in comparison with a case in which it is mounted to the hub. In addition, since the pulser section of the pulser ring is positioned at the groove on the brake disk, a state of projecting in the direction of the axle and hence taking too much space may be avoided. Consequently, an increase in diameter of the hub in association with the mounting of the pulser ring can be prevented. Simultaneously, the flexibility in the arrangement of the wheel speed sensor can be increased.

When the pulser ring is positioned between the brake disk and the final gear case, the pulser ring can hardly be seen from the outside. Thus, the appearance is improved.

Furthermore, when the wheel speed sensor is provided inside the swing arm so as to be invisible, the wheel speed sensor cannot be seen from the outside. Thus, the appearance is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to drawings, an embodiment of the present invention will be described.

Figure 1:
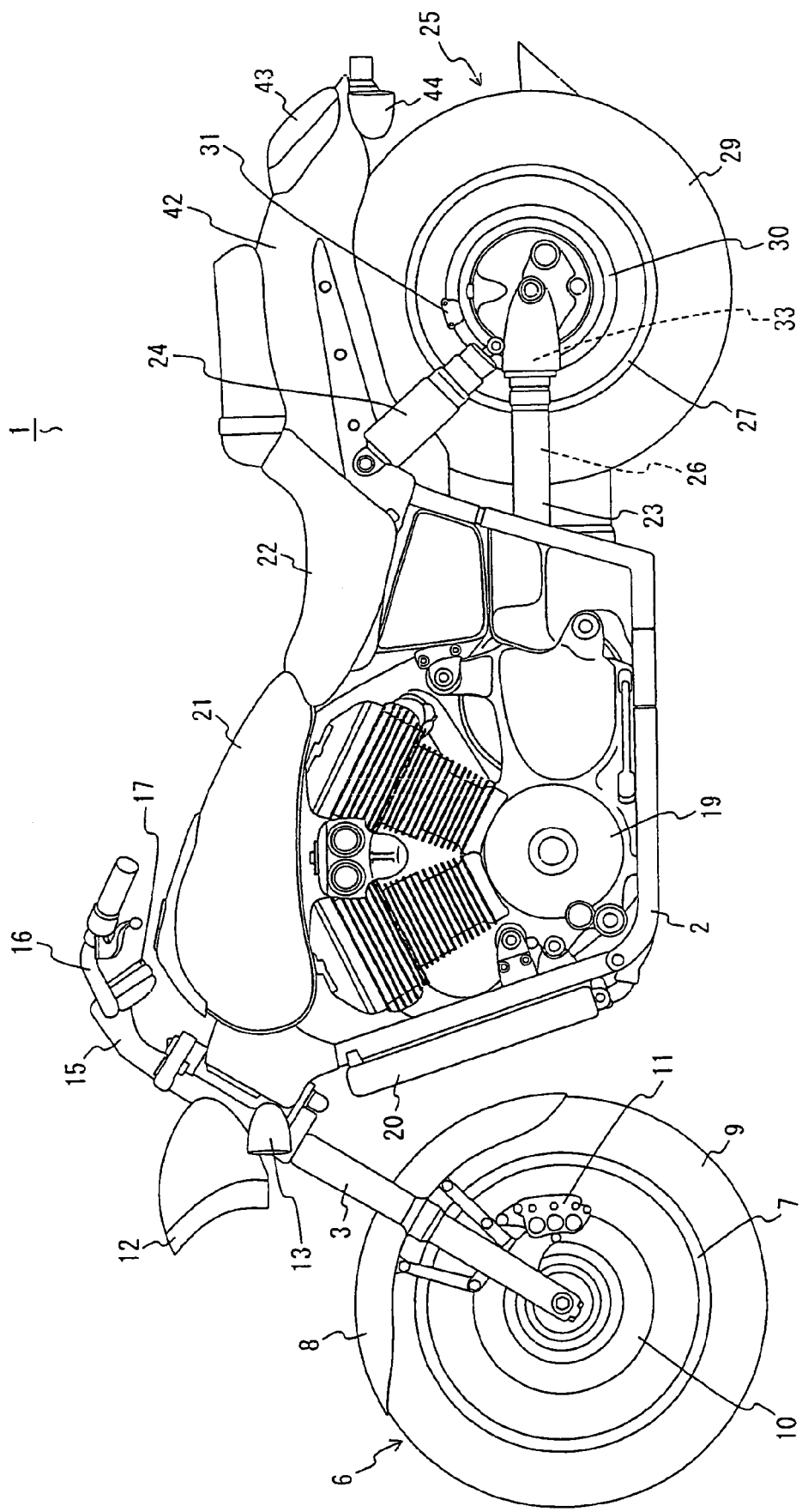
FIG. 1 is a side view showing an example of a motorcycle to which an embodiment of a pulser ring mounting structure according to the present invention is applied.

As shown in FIG. 1, a motorcycle 1 includes a vehicle body frame 2 of a double-cradle type with a front fork 3 being rotatably connected to an upper front portion of the vehicle body frame 2. A front wheel 6 is rotatably supported at a lower end of the front fork 3. The front wheel 6 includes a front disk wheel 7 and a front tire 9. The front disk wheel 7 is rotatably supported at the lower end of the front fork 3, and the front tire 9 is mounted to an outer periphery of the front disk wheel 7. An annular front brake disk 10 is secured to a side of the front disk wheel 7 and a front brake caliper 11 is mounted to the front brake disk 10. In addition, a front fender 8 is mounted above the front wheel 6 and is supported by the front fork 3.

As shown in FIG. 1, a headlight 12, a pair of left and right front blinkers 13, and a handle holder 15 are mounted to an upper end of the front fork 3. A steering handle 16 and a speed meter 17 are mounted to the handle holder 15.

As shown in FIG. 1, a V-type two-cylinder engine 19 is mounted at a central portion of the vehicle body frame 2 with a radiator 20 being mounted forwardly of the engine 19. On the other hand, a fuel tank 21 is placed above the engine 19, and a seat 22 is detachably mounted rearwardly of the fuel tank 21.

As shown in FIG. 1, a hollow swing arm (rear fork) 23 is swingably supported at a lower rear portion of the vehicle body frame 2. A rear shock absorber 24 is mounted upwardly of the swing arm 23 so as to connect the vehicle body frame 2 and the swing arm 23. A propeller shaft 26 for transmitting power of the engine 19 to a rear wheel 25 is rotatably inserted into the swing arm 23. The rear wheel 25 is connected to a rear end of the propeller shaft 26 and is rotatably supported at a rear end of the swing arm 23.

Figure 3:
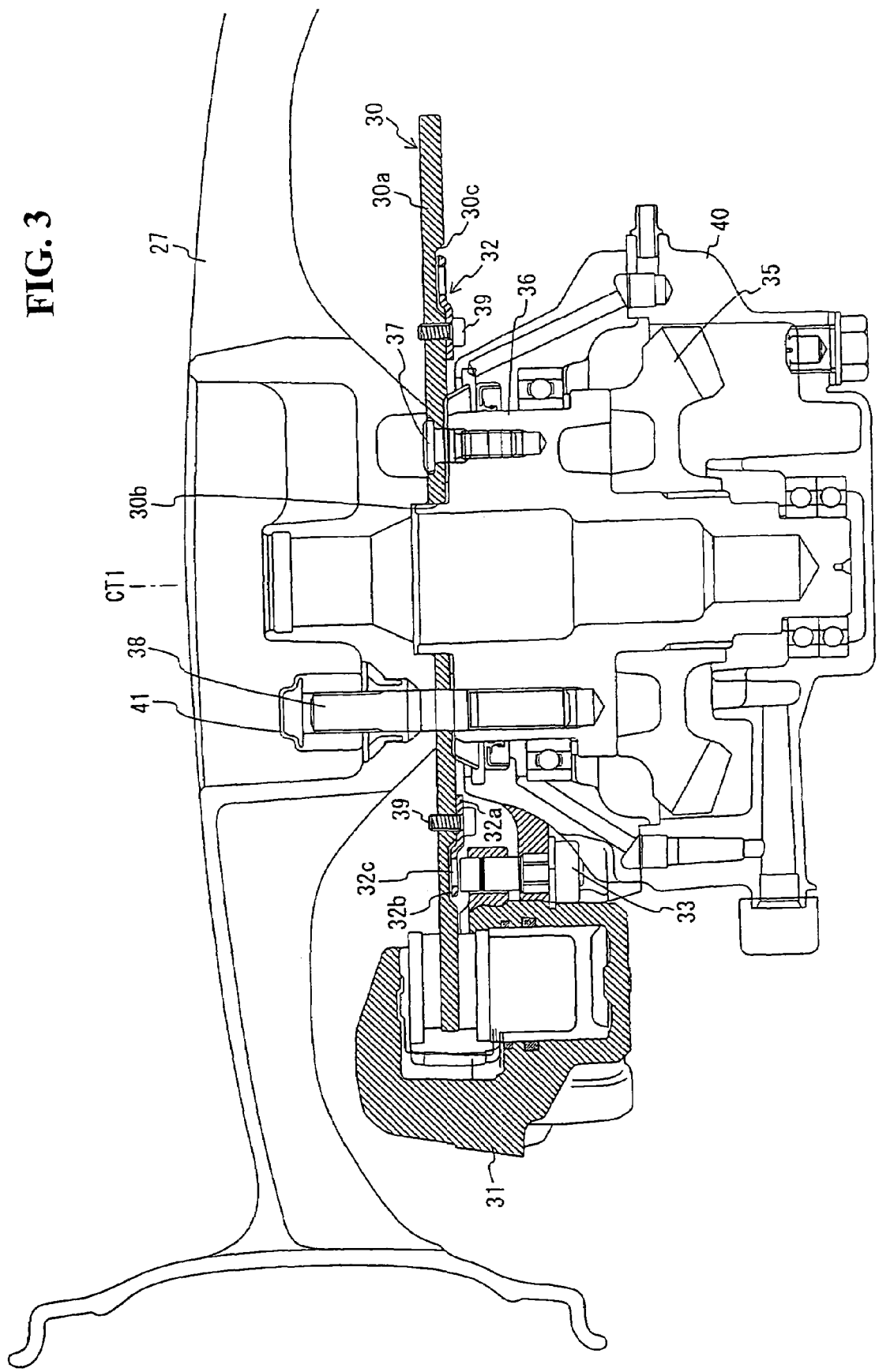
FIG. 3 is a cross-sectional view taken along a line A-A in the pulser ring mounting structure shown in FIG. 2.

As shown in FIG. 3, a hub 36 is rotatably supported about an axial center CT1 of an axle via a bevel gear 35 at the rear end of the propeller shaft 26. An annular rear brake disk 30 is secured to the hub 36 via a bolt 37. In addition, a rear disk wheel 27 is secured thereto via a bolt 38 and a ball head lock nut 41 so as to interpose the rear brake disk 30 therebetween. A rear tire 29 is mounted to an outer periphery of the rear disk wheel 27. A rear brake caliper 31 is mounted to the rear brake disk 30. Furthermore, a final gear case 40 is mounted to a rear end of the swing arm 23 so as to cover the bevel gear 35 and the hub 36.

Figure 2:
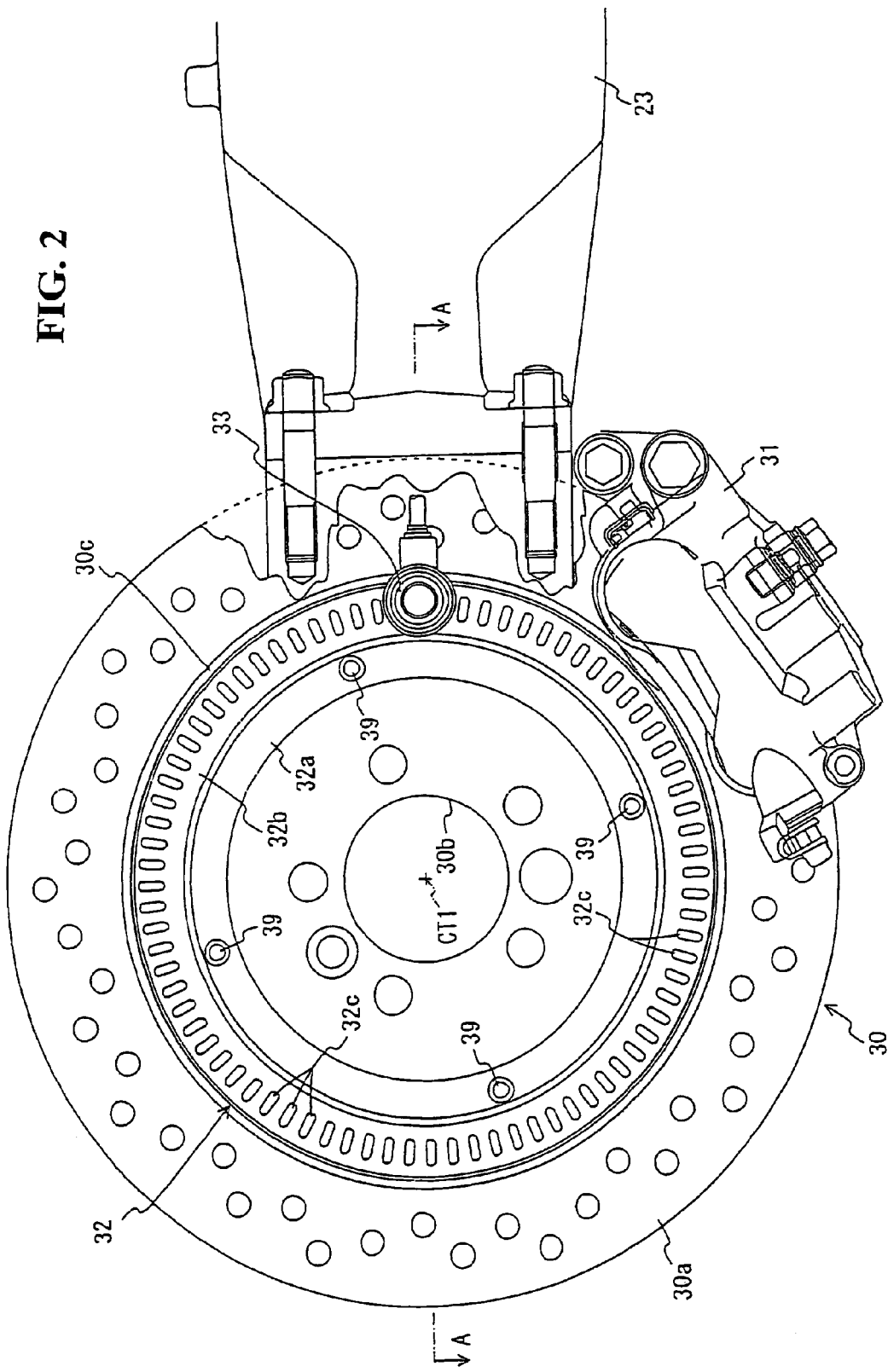
FIG. 2 is a side view showing an embodiment of the pulser ring mounting structure according to the present invention.

As shown in FIG. 2 and FIG. 3, the rear brake disk 30 includes an annular disk plate 30a formed with a hub-engagement hole 30b at a center portion thereof. An annular groove 30c is formed on a side surface of the disk plate 30a on one side. The annular groove 30c is of an annular shape. A stepped annular pulser ring 32 is secured to a side surface of the disk plate 30a by a bolt 39. The pulser ring 32 includes a ring body 32a, a pulser section 32b, and a pickup hole 32c. As shown in FIG. 3, the ring body 32a is located on the side surface of the disk plate 30a, and the pulser section 32b is located so as to sit in the groove 30c. The pulser section 32b is formed with a number of oval-shaped pickup holes 32c on a circumference thereof at regular pitches as shown in FIG. 2. A wheel speed sensor 33 is mounted in the direction of the axle to the final gear case 40 inside the swing arm 23 at an invisible position so as to oppose the pickup hole 32c of the pulser ring 32.

As shown in FIG. 1, a rear fender 42 is mounted to an upper rear portion of the vehicle body frame 2 above the rear wheel 25. The rear fender 42 is provided with a stop lamp 43, and a pair of left and right rear blinkers 44.

Since the motorcycle 1 is configured as described above, the wheel speed sensor 33 detects the number of the pickup holes 32c on the pulser ring 32 which passed over the wheel speed sensor 33 for a certain period as pulse signals and based on the detected pulse signals, the number of rotation of the rear wheel 25, that is, the wheel speed, is measured during operation of the motorcycle 1.

In this motorcycle 1, since the necessity to secure a space for accommodating the pulser ring 32 on the inner periphery of the rear brake disk 30 is eliminated, the engagement position with respect to the hub 36 is not moved radially outwardly. Consequently, the size of the hub-engagement hole 30b on the rear brake disk 30 can be reduced. Thus, an increase in the diameter of the hub 36 in association with the mounting of the pulser ring 32 can be avoided.

In addition, since the pulser ring 32 is not simply stacked on the side surface of the rear brake disk 30, but is mounted with the pulser section 32b disposed in the groove 30c on the rear brake disk 30, an increase in the amount of projection in the direction of the axle can be prevented. Therefore, an increase in the diameter of the hub 36 can be avoided. Thus, simultaneously, the flexibility of the arrangement of the wheel speed sensor 33 on the rear wheel 25 can be increased.

In addition, since the pulser ring 32 is positioned between the rear brake disk 30 and the final gear case 40, it can hardly be seen from the outside. Thus, the appearance thereof can be improved.

Furthermore, since the wheel speed sensor 33 is located inside the swing arm 23 so as to be invisible, it cannot be seen from the outside. Thus, the appearance is improved.

In the above-described embodiment, the motorcycle 1 with the pulser ring 32 being mounted to the rear brake disk 30 of the rear wheel 25 has been described. However, the present invention can be applied when the pulser ring (not shown) is mounted to the front brake disk 10 of the front wheel 6. In this case, the object of measuring the wheel speed of the front wheel 6 or the rear wheel 25 may either be for ABS or for the calculation of the vehicle speed.

In the above-described embodiment, the motorcycle 1 provided with the vehicle body frame 2 of a double cradle type has been described. However, the type of the vehicle body frame 2 is not specifically limited thereto.

In the above-described embodiment, the motorcycle 1 is provided with the rear wheel 25 of a shaft-drive type that has been described. However, the driving system of the rear wheel 25 is not limited thereto. For example, the present invention can be applied to motorcycles provided with the rear wheel 25 of a chain drive system or belt drive type.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a motorcycle in which an annular brake disk, an annular pulser ring formed with a pickup hole, and a wheel speed sensor for detecting pulse signals using the pickup hole are mounted to a wheel, a pulser ring mounting structure comprising:

a groove formed on a side surface of the brake disk in an annular shape, said pulser ring being mounted to the side surface of the brake disk with a pulser section positioned at the groove.

2. The pulser ring mounting structure according to claim 1, wherein the pulser ring is located between the brake disk and a final gear case.

3. The pulser ring mounting structure according to claim 1, wherein the pulser ring is provided with the wheel speed sensor inside a swing arm so as to be invisible.

4. The pulser ring mounting structure according to claim 2, wherein the pulser ring is provided with the wheel speed sensor inside a swing arm so as to be invisible.

5. The pulser ring mounting structure according to claim 1, wherein the pulser ring is provided with a plurality of pickup holes and said wheel speed sensor is operatively positioned adjacent to said plurality of pickup holes for detecting the number of pickup holes passing over the wheel speed sensor for determining the speed of the vehicle.

6. The pulser ring mounting structure according to claim 1, wherein the groove on a side surface of the brake disk is displaced a predetermined distance relative to a hub of the wheel.

7. The pulser ring mounting structure according to claim 6, wherein when the groove on the side surface of the brake disk is formed to be displaced a predetermined distance relative to the hub, an aperture for the brake disk for mounting on the hub of the wheel is reduced in size.

8. The pulser ring mounting structure according to claim 1, wherein the annular pulser ring is mounted on a rear wheel of the vehicle.

9. The pulser ring mounting structure according to claim 1, wherein the annular pulser ring is mounted on a front wheel of the vehicle.

10. The pulser ring mounting structure according to claim 1, wherein the groove is of a predetermined depth within a thickness of said brake disk and said annular pulser ring is mounted within the depth of said groove.

11. An annular pulser ring for use to determine a speed of a vehicle comprising:
   an annular brake disk;
   an annular pulser ring formed with a plurality of pickup holes;
   a wheel speed sensor for detecting pulse signals using the plurality of pickup holes; and
   a groove formed on a side surface of the brake disk in an annular shape, said pulser ring being mounted to the side surface of the brake disk with a pulser section positioned at the groove.

12. The pulser ring according to claim 11, wherein the pulser ring is located between the brake disk and a final gear case.

13. The pulser ring according to claim 11, wherein the pulser ring is provided with the wheel speed sensor inside a swing arm so as to be invisible.

14. The pulser ring according to claim 12, wherein the pulser ring is provided with the wheel speed sensor inside a swing arm so as to be invisible.

15. The pulser ring according to claim 11, wherein said wheel speed sensor is operatively positioned adjacent to said plurality of pickup holes for detecting the number of pickup holes passing over the wheel speed sensor for determining the speed of the vehicle.

16. The pulser ring according to claim 11, wherein the groove on a side surface of the brake disk is displaced a predetermined distance relative to a hub of the wheel.

17. The pulser ring according to claim 16, wherein when the groove on the side surface of the brake disk is formed to be displaced a predetermined distance relative to the hub, an aperture for the brake disk for mounting on the hub of the wheel is reduced in size.

18. The pulser ring according to claim 11, wherein the annular pulser ring is mounted on a rear wheel of the vehicle.

19. The pulser ring according to claim 11, wherein the annular pulser ring is mounted on a front wheel of the vehicle.

20. The pulser ring according to claim 11, wherein the groove is of a predetermined depth within a thickness of said brake disk and said annular pulser ring is mounted within the depth of said groove.

* * * * *